Figure 1:
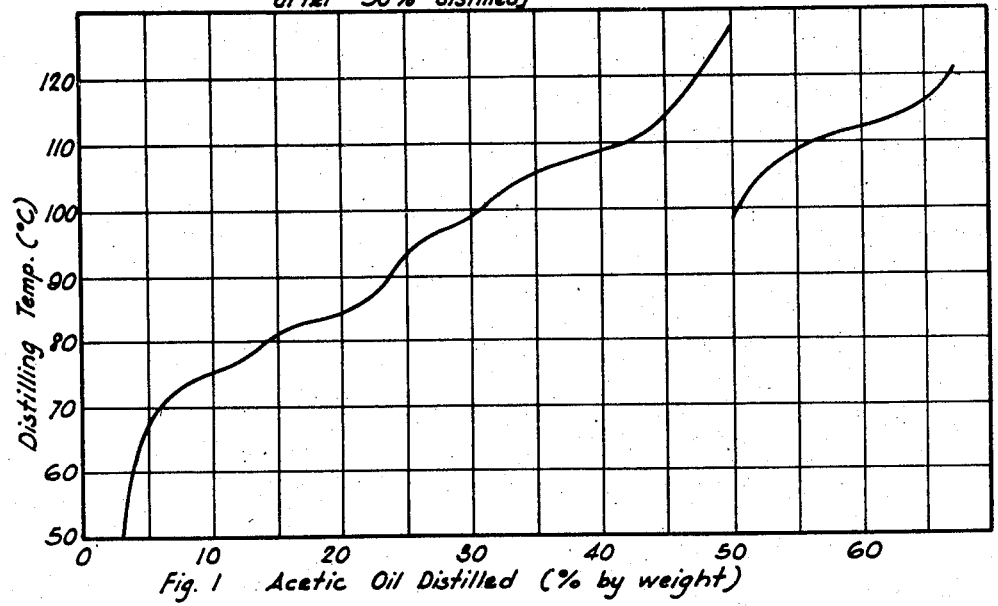

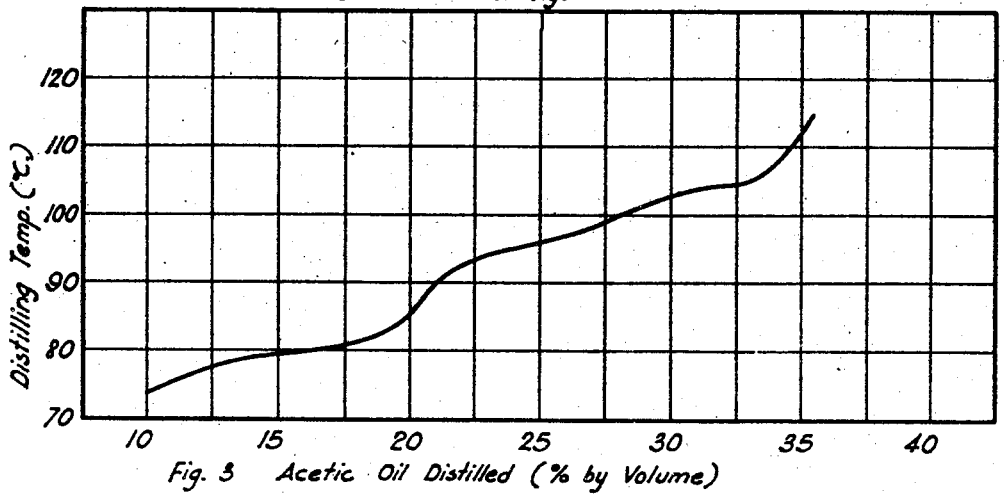
Fig. 3 Acetic Oil Distilled (% by Volume)
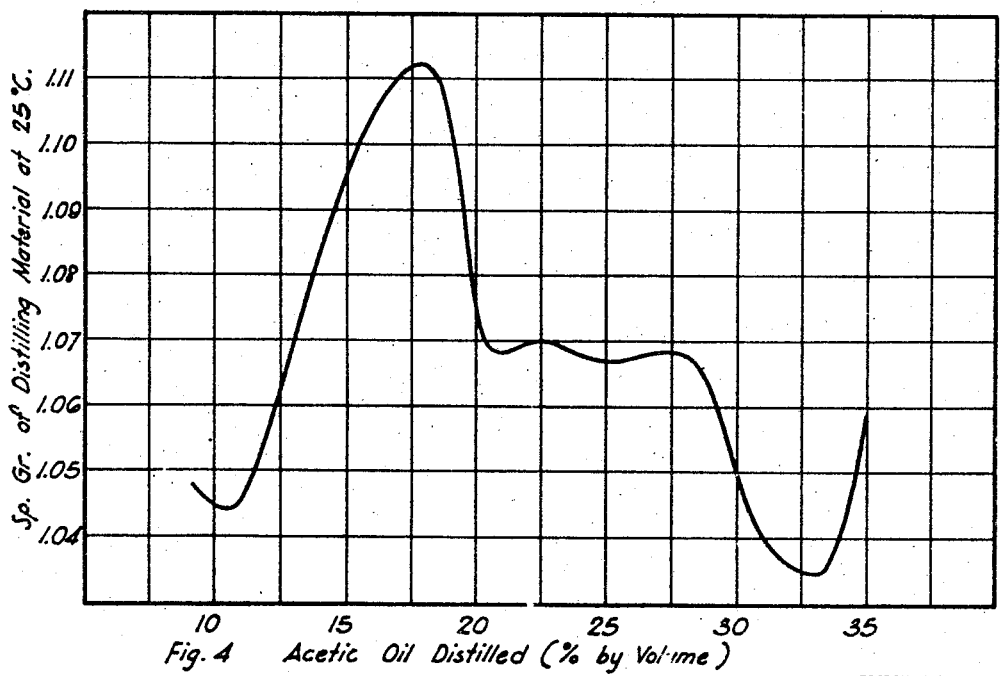
Fig. 4 Acetic Oil Distilled (% by Volume)
INVENTORS
Alfred A. Reiter
BY Floyd L. Beman
Griswold & Burdick
ATTORNEYS Patented Feb. 18, 1947

2,416,270

UNITED STATES PATENT OFFICE 2,416,270

SEPARATION OF PRODUCTS FROM WOOD DISTILLATE BY FRACTIONAL DISTILLATION

Alfred A. Reiter and Floyd L. Beman, Marquette, Mich., assignors to Cliffs Dow Chemical Company, Marquette, Mich., a corporation of Michigan Application September 29, 1942, Serial No. 460,167

2 Claims. (Cl. 202—40)

This invention relates to a method of isolating certain valuable products from pyroligneous acid and more particularly to a method of isolating the lower boiling products in a residue fraction of pyroligneous acid.

A comparatively recent development in the treatment of pyroligneous acid, particularly that derived from hardwoods, is the substitution of distillation and extraction methods in place of the older liming process for the recovery of acetone, acetic acid, methanol, methyl acetone, etc. In addition to permitting a more economical recovery of the products just mentioned, these methods also effect a partial separation of the materials previously obtained as tars into settled tars on the one hand and dissolved portions consisting essentially of mixtures of non-tarry organic compounds on the other hand, these products appearing separately as the result of different operations in the process. One such dissolved portion herein designated as "acetic oil" to distinguish it from other portions of tars or oils appearing in the process consists of a liquid product which steam distills along with acetic acid from the settled and demethanolized pyroligneous acid and which remains as a residue upon removing the water and a major portion of the low-boiling aliphatic acids, e. g., formic, acetic, and propionic acids. In one typical process the acetic oil is obtained by steam-distilling the demethanolized and settled pyroligneous acid, extracting the aqueous distillate with an organic solvent, such as butyl acetate, ethyl acetate, ether, mixtures of ethyl acetate with isopropyl ether, etc., recovering the solvent by distilling it from the extract at atmosphere pressure, and fractionally distilling the remaining portion of the extract under reduced pressure to recover crude acetic acid and leave the acetic oil as a still residue. Acetic oil so obtained corresponds closely with the still residue remaining when the crude acid of United States Patent 2,197,069 is fractionally distilled under reduced pressure to recover therefrom a major proportion of the acetic acid. Acetic oil obtained in this manner amounts to a substantial portion of the total organic products obtained from pyroligneous acid produced in the destructive distillation of hardwoods, such as maple, beech, birch, and oak. However, little, if any, information as to the composition of this oil has heretofore been available other than that it contains phenolic substances and that small amounts of volatile acids, e. g., acetic and propionic acids, may be recovered from it by steam distillation.

Although the character of the acetic oil obtained as described above may vary somewhat, depending upon the exact manner of carrying out the several operations of the process, it is usually obtained as a substantially anhydrous, non-viscous, acidic liquid which is at least partially soluble in water or dilute acetic acid and which is miscible with most organic solvents. The specific gravity of the acetic oil is usually greater than 1.0.

Attempts to recover valuable components from acetic oil by conventional methods involving treatment with alkalies or acids or by distillation at atmospheric pressure lead to excessive decomposition. Fractional distillation under reduced pressure by the ordinary procedure, even with a high reflux ratio, is not feasible because the gradual and substantially constant rise of the distilling temperature and the variation between succeeding lots of acetic oil mentioned above make it impossible to select accurately a fraction rich in a single component. Consequently, acetic oil has heretofore been used principally as fuel.

It is an object of this invention to provide a method whereby valuable compounds may be isolated readily from the acetic oil described above. A further object is the economical isolation of certain compounds not previously known to exist among the products obtained by the destructive distillation of wood.

As stated above, the fractional distillation under reduced pressure of the acetic oil and the selection of fractions in the usual manner does not permit the accurate selection of a fraction rich in a single component due to the gradual but substantially constant rise in the distilling temperature. This is illustrated by Figure 1 of the drawing in which the vapor temperatures of the distilling material noted during a vacuum distillation of a representative sample of acetic oil are plotted against the per cent by weight of material distilled. The break noted in the curve at 50 per cent distillation is due to the lowering of the pressure at this point from 50 millimeters to about 22 millimeters to avoid possible decomposition in the still.

Figure 2:
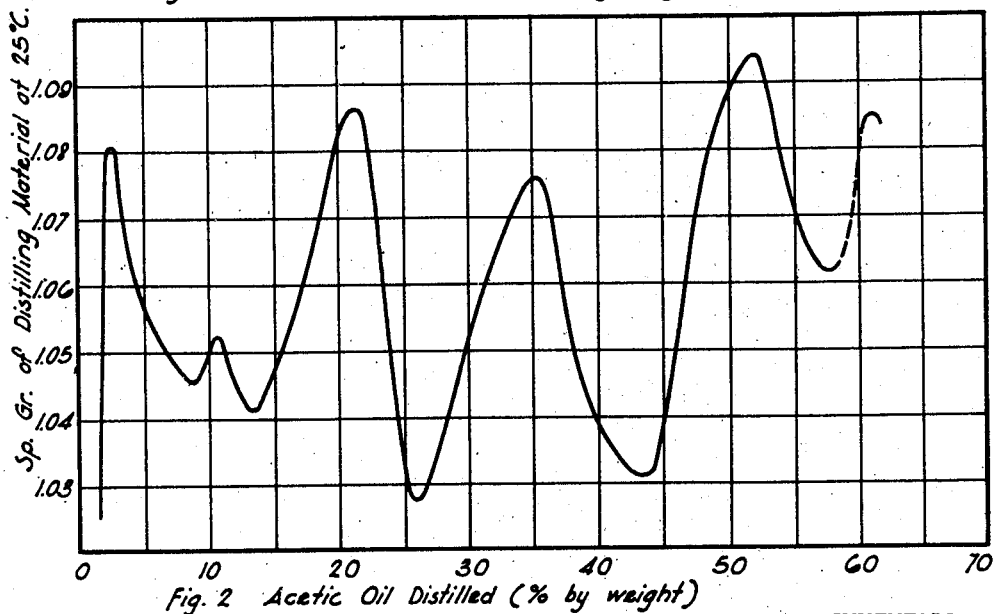

We have found, however, that when acetic oil is distilled with reflux, the specific gravity of the material distilling passes through a series of regions in which its average rate of change with respect to the amount of material distilled is alternately relatively small and relatively large. This is illustrated in Figure 2 in which the specific gravity of the material distilling is plotted against the per cent by weight of material distilled. Regions in which the average rate of change of the specific gravity with respect to the amount of material distilled is relatively small are represented by portions of the curve near maximum or minimum points, at which points the rate of change of the specific gravity is actually zero, and by portions of the curve which approach parallelism with the distillate axis but which may not actually pass through a maximum or minimum point. Regions in which the rate of change of the specific gravity with respect to the amount of material distilled is relatively large are represented by portions of the curve which approach parallelism with the specific gravity axis. We have further found that when the specific gravity is passing through the regions of relatively small average rate of change with respect to the amount of material distilled, the material distilling is rich in a single component. It is thus possible to distill the acetic oil through an efficient fractionating column and to select a fraction of distillate rich in a single component by beginning the collection of the fraction when the specific gravity of the material distilling is approaching a region wherein its average rate of change with respect to the amount of material distilled is relatively small, and terminating the collection of the fraction when the specific gravity of the material distilling has passed through and is receding from this region. Portions of distillate from which crystals separate may be filtered and the specific gravity of the liquid portion determined. A component which may be present only in minor amounts in the mixture being distilled may, unless an excessive amount of reflux is maintained, cause only a slight variation in the rate of change of the specific gravity of the material distilling. In such instances it may be more economical to collect the minor component in a fraction along with a major component and, if desired, to subsequently effect separation of one or more components from the collected fraction. It is, of course, understood that in certain instances it may also be advantageous to collect two or more of the major components of the mixture in the same fraction, in which case the collection of the fraction may be started when the rate of change of the specific gravity of the material distilling indicates that the latter is becoming richer in the lowest boiling desired component and terminating the collection of the fraction when the rate of change of the specific gravity of the material distilling indicates that the latter is becoming less rich in the highest boiling desired component. Although the distillation may be carried out at any desired pressure, it is usually carried out under sub-atmospheric pressure and preferably below 400 millimeters of mercury since some decomposition of the less heat-stable components may occur at higher temperatures.

Although the collection of a fraction rich in a particular component is controlled by means of specific gravity determinations, it is advantageous to observe the distilling temperature during the collection of the fraction, since at a given pressure the general temperature range in which the fraction distills will serve to differentiate it from other fractions which may be collected over the same range of specific gravity, but over different temperature ranges. By operating in the manner described above, it is possible to collect fairly large fractions rich in acetol acetate and in an acetoxy-oxo-butane, respectively, which two compounds have not previously been known to exist among the components of pyroligneous acid and the purification of which are described in our concurrently filed and co-pending applications Serial No. 460,168, now Patent 2,401,274, granted May 28, 1946, and Serial No. 508,424. Fractions rich in higher phenols, such as guaiacol and creosol, may also be collected and treated to recover the higher phenol in purified form as described in our concurrently filed and co-pending applications Serial No. 460,170, now Patent 2,400,-466, and Serial No. 460,171. Other fractions rich in acetol, acetic acid, butyric acid, and furfural may also be collected from the acetic oil as well as a fraction rich in a water-soluble cyclic keto-aldehyde which has not heretofore been described. Minor fractions rich in other components may be collected in a similar manner, or two or more fractions may be collected together if desired. The fractions so obtained are then neutralized, i. e., treated with sufficient alkali to form the metal salts of the free acids present.

Alternatively, the acetic oil may be first neutralized and then fractionally distilled, the desired fractions being collected in the manner previously described. Fractions containing free acids, such as acetic and butyric acids are, of course, not obtained by fractionally distilling the neutralized acetic oil and the specific gravity range over which any desired fraction is collected may be somewhat different than when fractionally distilling the unneutralized oil, but otherwise the character and relative proportions of the fractions collected are substantially the same irrespective of the order in which the neutralization and fractional distillation are carried out. In Figures 3 and 4, respectively, of the drawing the distilling temperature and the specific gravity of the material distilling observed during a distillation of a neutralized representative sample of acetic oil are shown plotted against the per cent by volume of material distilled. Regions in which the average rate of change of the specific gravity of the material distilling with respect to the amount of material distilled are relatively small are illustrated in Figure 4 by the maximum and minimum points of the curve as well as by the region where the curve approaches parallelism with the distillate axis, and these parts of the curve represent regions where the material distilling is rich in a single component of the neutralized acetic oil.

The neutralization of the acetic oil or of the individual fractions obtained by distilling the acetic oil is usually accomplished by adding an amount of an aqueous alkali such as sodium carbonate, potassium carbonate, sodium hydroxide, sodium bicarbonate, calcium hydroxide, etc., sufficient to give the mixture a pH of from 5.5 to 8. An excess of alkali over that sufficient to combine with the free acids present is usually avoided, since such excess of alkali tends to cause hydrolysis of the valuable esters present. Neutralization is ordinarily carried out at temperatures below 80° C. and preferably below 40° C. since, as hereinbefore mentioned, some of the components of the acetic oil tend to resinify or otherwise react to form by-products at higher temperatures, particularly under the conditions prevailing during neutralization. It should be mentioned, however, that in the case of fractions rich in phenolic compounds it may be desirable to neutralize with a sufficient amount of an appropriate alkali, such as an alkali metal hydroxide, to extract the phenol as well as the acids and higher temperatures may also be maintained during such neutralization, since recovery of the phenols may be facilitated by so doing. Sufficient water may be used to dissolve the salts formed, although an excess is preferably avoided since some of the neutral components of the acetic oil are water-soluble and are more easily separated from the aqueous portion of the neutralized mixture if the proportion of water is kept as small as convenient. After the neutralization is complete, the non-acidic components usually form a distinct layer and are separated from the solution of the salts formed during the neutralization. Water-soluble compounds, such as sodium chloride, may be added to the neutralized mixture to facilitate the separation, although this is not usually desirable when the acids are to be recovered from the aqueous portion of the mixture. When neutral components soluble in the salt solution are present, the separation is preferably accomplished by extraction with an organic water-immiscible solvent, e. g. with benzene, ether, ethyl acetate, carbon tetrachloride, etc. Alternatively, a substantially dry alkaline material such as powdered sodium carbonate may be used to neutralize the acids present and the neutral oils separated from the solid salts of the acid components by decanting or filtering.

The salts remaining after separation of the non-acidic components from the neutralized mixture may be treated in any desired manner for the recovery of the acidic components. Thus, an aqueous solution of the salts may, for example, be first freed from volatile components by distilling with steam and then acidified with a mineral acid to liberate the free acids. The free acids may then be separated from the aqueous portion of the mixture, or the acidified mixture may be extracted with a solvent, such as ethyl acetate, carbon tetrachloride or benzene. Alternatively, the acidified mixture may be distilled with steam to remove the acidic components and the latter then separated or extracted from the distillate. The separated acids, or the extract thereof, may then be fractionally distilled to recover the individual acids in a high state of purity.

The neutral fractions resulting from the neutralization and fractional distillation may, if desired, be further purified, e. g., by refractionating, usually under reduced pressure. In the case of fractions neutralized after fractional distillation, refractionation is preferably preceded by a rapid distillation under reduced pressure without reflux to free the material from the last traces of salts, since prolonged heating of some of the less heat-stable products in contact with such salts may cause considerable decomposition or resinification.

Certain advantages of the invention will be seen from the following examples, which are illustrative and are not to be construed as limiting the invention:

*Example 1*

1360 pounds of unneutralized acetic oil were distilled at a pressure of 50 millimeters of mercury through an efficient fractionating column while maintaining a reflux ratio of about 8 to 1. The specific gravity at 25° C. of the material distilling and the temperature of the vapor in the still head were noted periodically. The specific gravity of the material distilling rose rapidly to 1.081 and then declined to 1.064 at which point the distilling temperature was 53.0°. The collection of the first fraction was terminated at this point and the fraction, which weighed 50.7 pounds, was found to be rich in acetic acid. Distillation was continued until the specific gravity had decreased to 1.045 and then increased to 1.052, at which point the distilling temperature was 75° C. The collection of the second fraction was terminated at this point and the fraction, which weighed 93.4 pounds, was found to be rich in acetol. Distillation was continued until the specific gravity had decreased to 1.041 and then increased to 1.059, at which point the distilling temperature was 82.5° C. The collection of the third fraction was terminated at this point and the fraction, which weighed 89.9 pounds, was found to be rich in a saturated cyclic keto-aldehyde. Distillation was continued until the specific gravity had increased to 1.086 and then decreased to 1.055, at which point the distilling temperature was 88.5° C. Collection of the fourth fraction was terminated at this point and the fraction, which weighed 85.9 pounds, was found to be rich in furfural. Distillation was continued until the specific gravity had decreased to 1.027 and then increased to 1.049 at which point the distilling temperature was 97.5° C. Collection of the fifth fraction was terminated at this point and the fraction, which weighed 81.2 pounds was found to be rich in butyric acid. Distillation was continued until the specific gravity had increased to 1.076 and then decreased to 1.046, at which point the distilling temperature was 108° C. The collection of the sixth fraction was terminated at this point and the fraction, which weighed 122.6 pounds, was found to be rich in acetol acetate. Distillation was continued until the specific gravity had decreased to 1.031 and then increased to 1.058, at which point the distilling temperature was 118° C. The collection of the seventh fraction was terminated at this point and the fraction, which weighed 108.4 pounds was found to be rich in an acetoxy-oxo-butane. Distillation was continued until the specific gravity had increased to 1.094 and then decreased to 1.065 at which point the distilling temperature was 111° C., the pressure during the collection of the fraction having been lowered from 50 millimeters to about 22 millimeters to avoid possible decomposition in the still. The collection of the eighth fraction was terminated at this point and the fraction, which weighed 134.9 pounds was found to be rich in guaiacol. Distillation was continued until the specific gravity had decreased to below 1.062 and then increased to 1.078 at which point the distilling temperature was 113.5° C. The collection of the ninth fraction was terminated at this point and the distillation discontinued. The specific gravity of the material distilling was not taken continuously during the collection of the ninth fraction due to the separation of crystals of methyl cyclopentenolone from the material distilling during collection of a part of the fraction. The ninth fraction, which weighed 84 pounds was filtered and the liquid portion was found to be rich in creosol.

*Example 2*

30.8 pounds of a fraction rich in butyric acid, collected in the manner described for the collection of the fifth fraction in Example 1, were mixed with 15.3 pounds of water and neutralized with 5.5 pounds of sodium carbonate. A layer of oily material was separated from the neutralized mixture and the aqueous salt layer was steam distilled to remove traces of volatile non-acidic substances. The salt solution was then acidified with 5.3 pounds of 100 per cent sulfuric acid and the acidified solution was distilled with steam to recover volatile acids. 66 pounds of distillate were collected. The distillate was extracted with ethyl acetate and the aqueous portion then discarded. The ethyl acetate from the extraction operation was fractionally distilled and there was thus recovered, in addition to the ethyl acetate and a small forefraction of acetic acid, 5.11 pounds of pure butyric acid. .33 pound of residue remained in the still at the end of the distillation.

Example 3

1565 pounds of a fraction rich in acetol acetate, collected in the manner described for the collection of the sixth fraction in Example 1, were mixed with 738 pounds of water and neutralized to a pH of 7 with 87 pounds of sodium carbonate while maintaining the temperature below 80° C. Upon allowing the mixture to stand, an aqueous and an oil layer formed and these were separated. The aqueous layer was steam distilled to remove traces of volatile non-acidic compounds and acidified and then treated for the recovery of butyric acid in the same manner as the aqueous solution of Example 2. The oily layer after separation from the aqueous layer weighed 1384 pounds. It was distilled without fractionation at a pressure of 20 millimeters of mercury and the distillate, which weighed 1266 pounds, was then distilled at a pressure of 50 millimeters of mercury through an efficient fractionating column while maintaining a reflux ratio of about 8 to 1, and the fraction boiling at 100° C. collected. The collected fraction weighed 462 pounds and was about 95 per cent pure acetol acetate.

Example 4

36,000 cc. of acetic oil were mixed with 36,000 cc. of water and neutralized to a pH of 7 with 2,880 grams of sodium carbonate while maintaining the temperature of the mixture below 40° C. An oily layer of 26,500 cc. was separated from the mixture and distilled under reduced pressure without fractionation to free it from traces of salts. The distillate was then redistilled at a pressure of 50 millimeters of mercury through an efficient fractionating column while maintaining a reflux ratio of about 10 to 1. The specific gravity at 25° C. of the material distilling and the vapor temperature in the still head were noted periodically. A first or fore-fraction of 4,600 cc. was collected. At this point, the specific gravity of the material distilling was 1.069 and increasing and the distilling temperature was 78° C. Distillation was continued until the specific gravity of the material distilling had increased to 1.112 and then decreased to 1.082 and the distilling temperature was 84° C. At this point, collection of the second fraction, which consisted of 2,500 cc. of a liquid rich in furfural, was terminated. Distillation was continued until the specific gravity after decreasing to 1.069 had changed relatively little during the collection of several thousand cubic centimeters of distillate and had then decreased to 1.050, and the distilling temperature was 103° C. At this point the collection of the third fraction, which consisted of 3,700 cc. of a liquid rich in acetol acetate was terminated. Distillation was continued until the specific gravity had decreased to 1.035 and then increased to 1.065, and the distilling temperature was 114° C. At this point, the collection of the fourth fraction, which consisted of 2,000 cc. of a liquid rich in an acetoxy-oxo-butane, was terminated and the distillation discontinued. The fractions rich in furfural and acetol acetate were refractionated without further treatment to recover substantially pure furfural and acetol acetate, respectively.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. In a method for separating a component of a mixture selected from the class consisting of acetic oil and acetic oil which has been freed of acidic ingredients by neutralization, the steps which consist in fractionally distilling the mixture and beginning collection of a fraction of distillate when the specific gravity of the material distilling is receding from a region in which its direction of change was reversed and is approaching a region wherein its average rate of change with respect to the amount of material distilled is relatively small, continuing collection of the fraction until the specific gravity passes through the last-mentioned region and terminating collection of the fraction when the specific gravity is receding from said region.

2. In a method for separating a component of acetic oil the steps which consist in fractionally distilling the acetic oil and beginning collection of a fraction of distillate when the specific gravity of the material distilling is receding from a region in which its direction of change was reversed and is approaching a region wherein its average rate of change with respect to the amount of material distilled is relatively small, continuing collection of the fraction until the specific gravity passes through the last-mentioned region and terminating collection of the fraction when the specific gravity is receding from said region.

ALFRED A. REITER.
FLOYD L. BEMAN.

REFERENCES CITED

The following references are of record in the file of this patent:

UNITED STATES PATENTS

| Number | Name | Date |
| --- | --- | --- |
| 2,251,771 | Wynn et al. | Aug. 5, 1941 |
| 1,580,144 | Legg et al. | Apr. 13, 1926 |
| 1,868,102 | Henderson et al. | July 19, 1932 |
| 2,227,979 | Othmer | Jan. 7, 1941 |
| 1,928,746 | Wilson | Oct. 3, 1933 |
| 2,290,157 | Bright | July 21, 1942 |
| 2,223,299 | Chesley | Nov. 26, 1940 |

FOREIGN PATENTS

| Number | Country | Date |
| --- | --- | --- |
| 376,009 | British | July 7, 1932 |

OTHER REFERENCES

Industrial and Engineering Chem., vol. 9, pp. 462–464 (May 1917). (Copy in Scientific Library.)

Shriner and Fuson, "The Systematic Identification of Organic Compounds," second edition (1940), published by John Wiley & Sons, Inc. (Copy in Library of Congress, pp. 101–105.)